United States Patent [19]

Ariniello

[11] 4,456,200
[45] Jun. 26, 1984

[54] PNEUMATIC MONITORING SYSTEM FOR A MAGNETIC TAPE DRIVE

[75] Inventor: Robert M. Ariniello, Boulder, Colo.

[73] Assignee: Storage Technology Corporation, Louisville, Colo.

[21] Appl. No.: 395,606

[22] Filed: Jul. 6, 1982

[51] Int. Cl.³ .................. G11B 15/28; G11B 15/46; G11B 15/58; G11B 19/28

[52] U.S. Cl. .................. 242/185; 226/91; 242/188; 360/73; 360/90

[58] Field of Search .............. 242/185, 182, 183, 184, 242/195, 188; 226/91, 95, 97, 188; 360/88, 90, 93, 95, 71, 73, 74.1

[56] References Cited

U.S. PATENT DOCUMENTS

| | | | |
|---|---|---|---|
| 3,134,527 | 5/1964 | Willis | 226/97 |
| 3,342,430 | 9/1967 | Murphy | 242/184 |
| 3,393,878 | 7/1968 | Aweida et al. | 242/182 |
| 3,795,371 | 3/1974 | Tolini et al. | 242/182 |
| 3,823,895 | 7/1974 | Jones et al. | 242/182 X |
| 3,863,863 | 2/1975 | Ende | 242/182 |
| 3,866,855 | 2/1975 | Bryer | 242/184 |
| 3,948,463 | 4/1976 | Godbout | 242/182 |
| 4,065,044 | 12/1977 | Painter | 226/188 |
| 4,093,148 | 6/1978 | Urynowicz et al. | 242/182 |
| 4,189,113 | 2/1980 | Epina et al. | 242/182 |
| 4,331,306 | 5/1982 | Epina et al. | 242/182 |

*Primary Examiner*—Stuart S. Levy
*Assistant Examiner*—Scott J. Haughland
*Attorney, Agent, or Firm*—Woodcock, Washburn, Kurtz, Mackiewicz & Norris

[57] ABSTRACT

A pneumatic monitoring system for a magnetic tape drive includes a single sensor which includes a differential pressure transducer. Points in the tape drive to which vacuum is applied are coupled to one side of the sensor and points in the tape drive to which pressure is applied are coupled to the other side of the detector. The sensor produces an analog voltage representing the state of the pneumatic system. It is digitized and applied to a microprocessor which compares the sensor voltage to present ranges for calibrated conditions of the tape drive. If the sensed voltage is outside of these ranges, error conditions are indicated.

12 Claims, 7 Drawing Figures

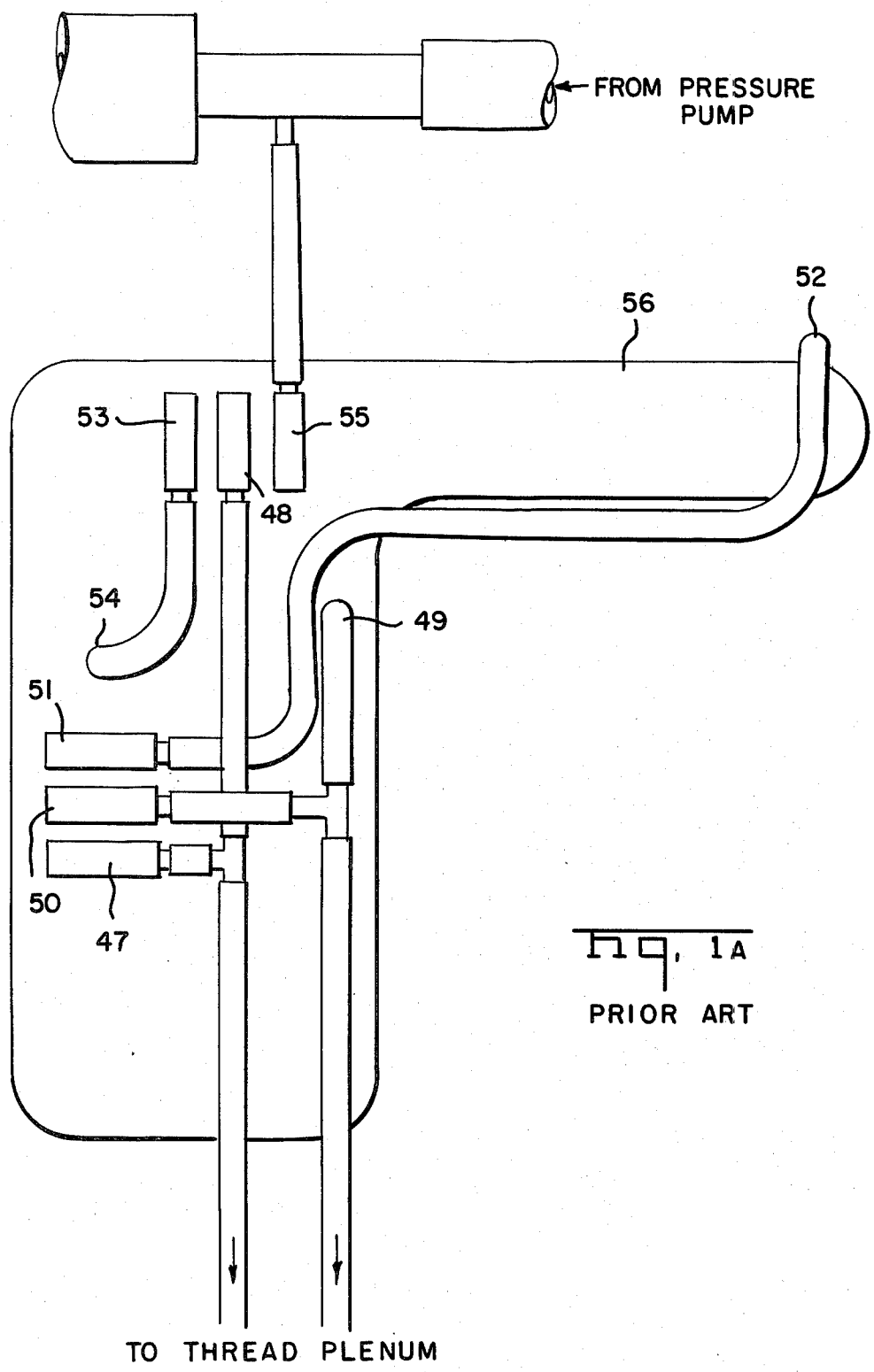

TO COLUMN VACUUM PLENUM

TO THREAD PLENUM

PNEUMATIC MONITORING SYSTEM FOR A MAGNETIC TAPE DRIVE

BACKGROUND OF THE INVENTION

This invention relates to magnetic tape drives and more particularly, to a system for monitoring the vacuum and pressure which control the movement of magnetic tape in the drive.

High speed, high density magnetic tape drives are extensively used for storing digital data in computer systems. The tape drive supplied by Storage Technology Corporation under its model designation 1950 is a typical drive which uses vacuum and pressure to control the movement of magnetic tape in the drive. The pneumatic system for this tape drive is shown in U.S. Pat. No. 4,331,306—Epina, et al, issued May 25, 1982. In this tape drive ten discrete pressure and vacuum switches provide pneumatic sense information which indicates the completion or presence of normal drive conditions or they indicate that pneumatic levels have fallen below operational values due to pneumatic system component failure, such as broken drive belts, stuck air valves, loose hoses and the like. The cost of these multiple pressure and vacuum switches is significant. More importantly, these separate pressure and vacuum sensors sometimes detract from the reliability of the system. The sensors themselves are subject to failure and their failure causes the tape drive to be taken out of operation while the fault is diagnosed. While it is important that pressure and vacuum be maintained at the ten discrete locations at which they are presently sensed, a variation in the vacuum or pressure from normal at any given location is not necessarily critical to the operation. In the prior art, these sense switches are connected in an operate/not operate mode. When any one sensor indicates that the pressure or vacuum at its location is out of limits, the operation of the machine stops while the problem is diagnosed. The more desirable mode of operation is to determine whether the overall pneumatic system is above or below the capability for which normal operation is obtained. If a variation in the pneumatic system occurs, but it does not bring the entire system below that capability, then it is desirable to permit continued operation of the machine, but to provide an indication of the deviation so that it can be checked during routine maintenance.

Furthermore, the prior art sensors are subject to changes in ambient pressure. Significant changes in ambient pressure, such as occurs at different altitudes, require that drive pneumatic levels be re-adjusted to accommodate this change.

It is an object of the present invention to provide a pneumatic monitoring system which more reliably indicates the capability of the tape drive.

It is another object of the present invention, to provide a pneumatic monitoring system for a magnetic tape drive which automatically compensates for changes in ambient pressure.

It is another object of the present invention, to provide a monitoring system for a magnetic tape drive which accurately locates the failure in the pneumatic system.

It is another object of the present invention to provide a monitoring system for a magnetic tape drive which allows continued operation despite slightly marginal pneumatic conditions (due to small leaks, etc.) while flagging the soft failure for correction during normal maintenance.

SUMMARY OF THE INVENTION

In accordance with the present invention, the pneumatic system of a magnetic tape drive is monitored by a single sensor which produces an output representing the level of vacuum and pressure present in the tape drive. The output of this sensor is connected to a microprocessor which monitors the pneumatics. The tape drive is initially operated in a startup mode during which various test operations are performed and the pneumatic condition of the drive is sensed and a signal representing the magnitude of vacuum and pressure is stored. Thereafter, when the tape drive is operated in a run mode in which digital data is recorded and read, the output of the pneumatic sensor is compared to the calibration level determined during the startup mode. In this manner, changes in ambient pressure are compensated for each time the tape drive is operated in a startup mode. Furthermore, failure at any location in the pneumatic system can be determined from its unique effect on the signal produced by the common sensor. The microprocessor responds to these unique changes to produce outputs indicating the location of the failure and whether or not it is critical to the operation of the machine.

In carrying out the invention, a pressure bus is coupled to several locations in the tape drive at which pressure is normally present. A vacuum bus is coupled to several locations at which vacuum is normally present. The pressure bus is connected to one side of a piezoelectric crystal (a piezoelectric crystal being an example of a type of differential pressure transducer successfully used) and the vacuum bus is connected to the other side of this crystal. This crystal is part of the sensor which produces a single output indicating the condition of the pneumatic system. This analog signal is converted to a digital signal which is applied to the microprocessor. The microprocessor monitors the sensor signal and produces appropriate outputs indicating the condition of the pneumatic system in the tape drive.

The foregoing and other objects, features and advantages of the invention will be better understood from the following more detailed description and appended claims.

SHORT DESCRIPTION OF THE DRAWINGS

FIG. 1a depicts the prior art pneumatic sensors;

Figure 3:
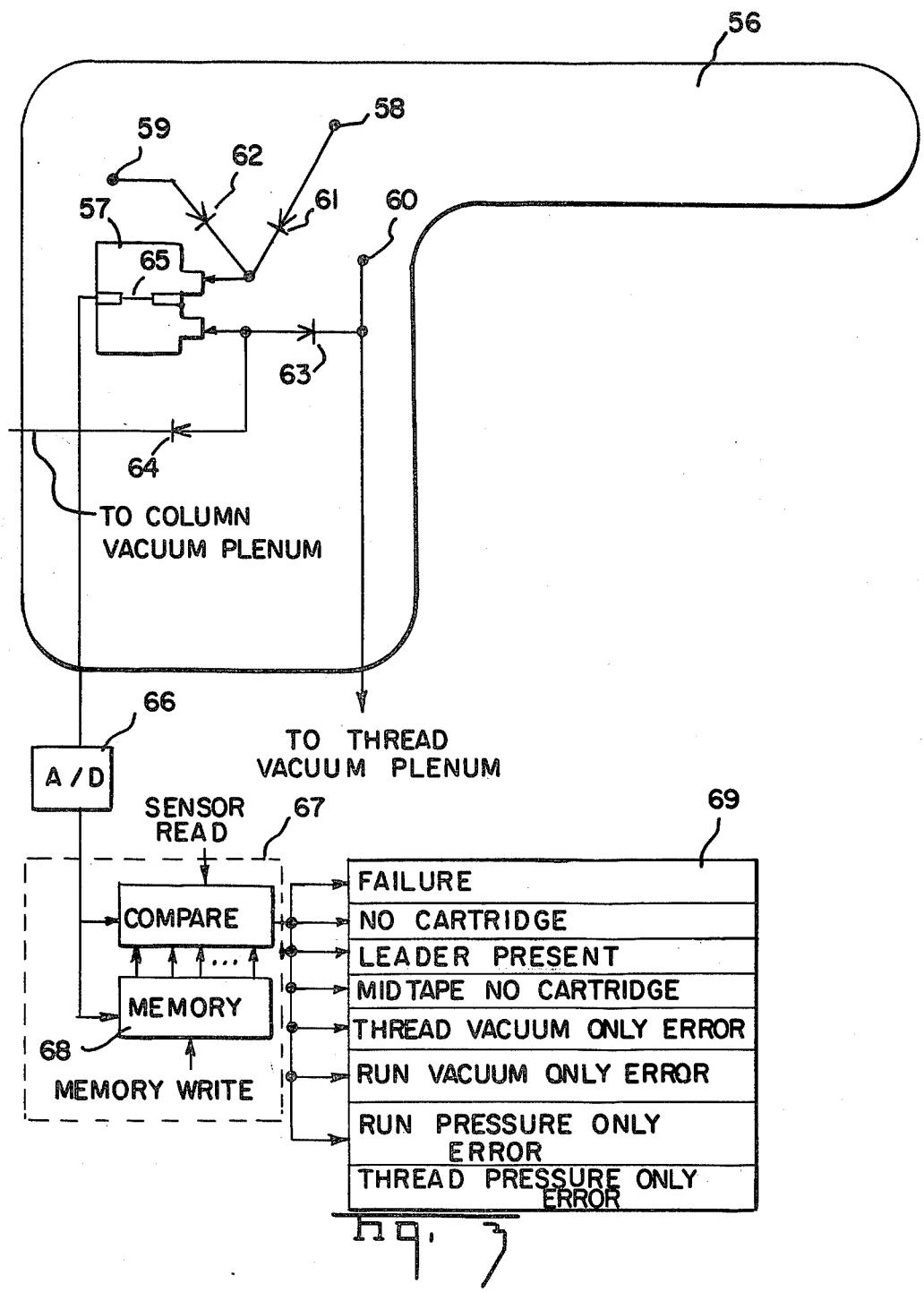
Figure 4:
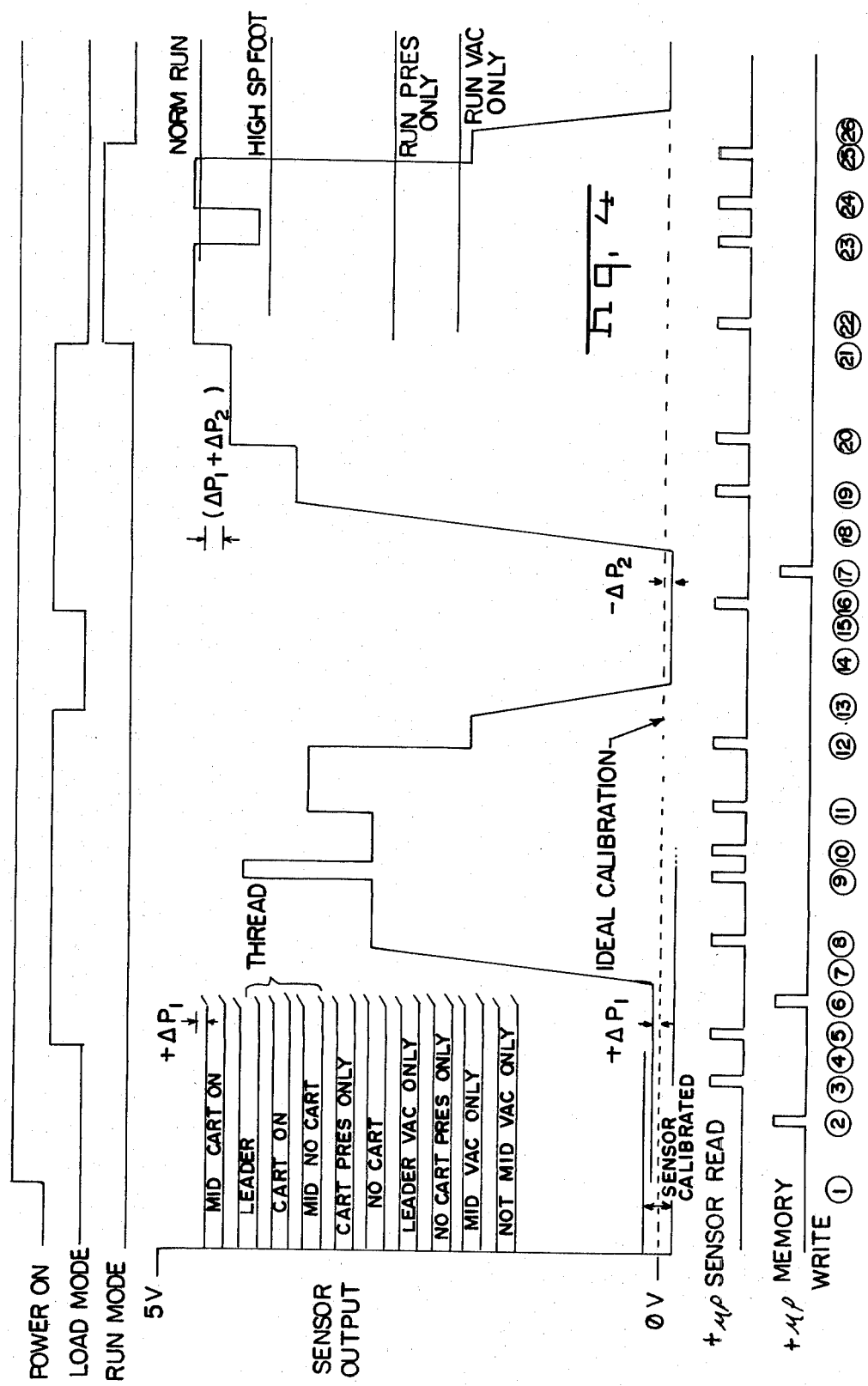
Figure 5:
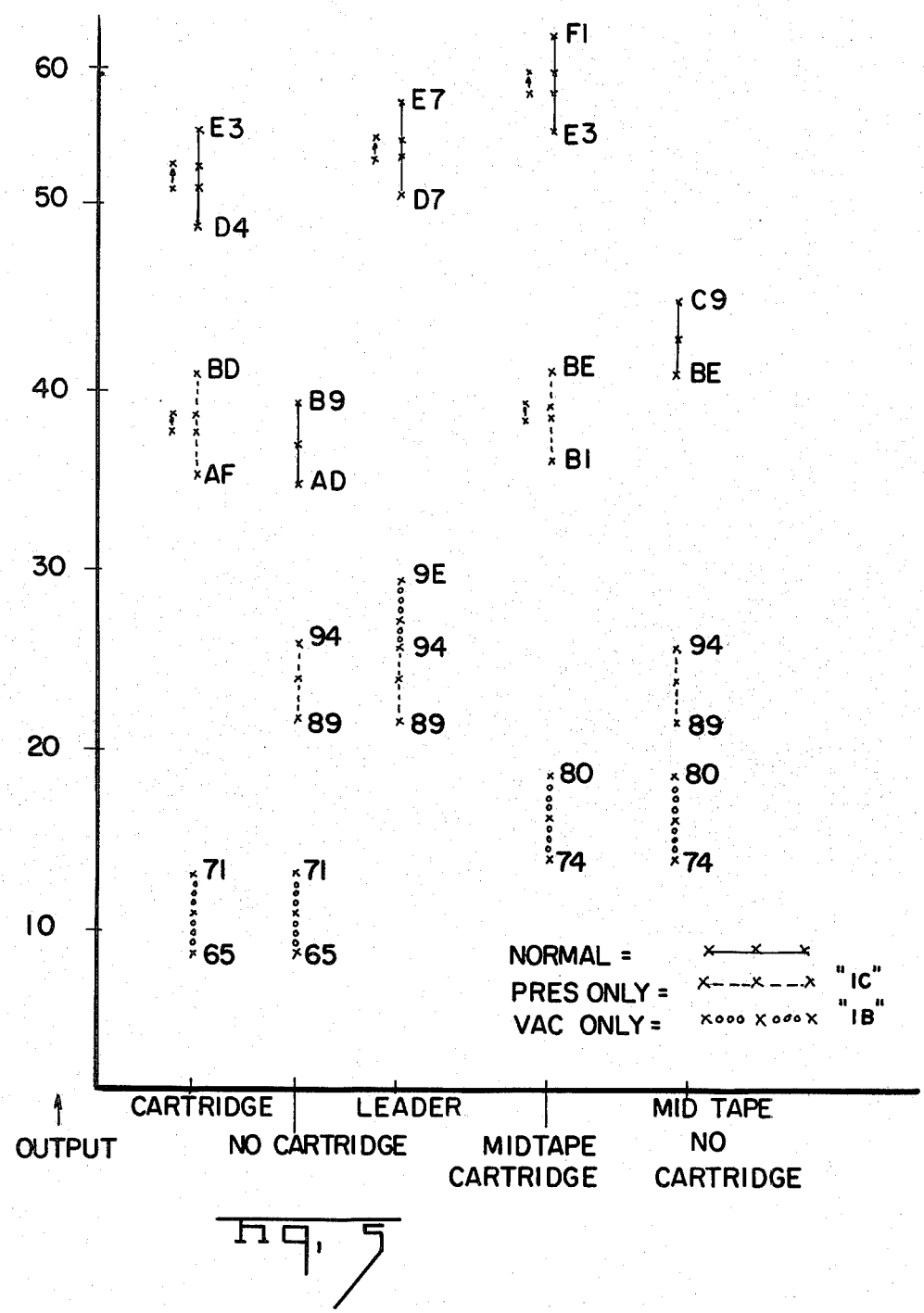

FIG. 3 schematically shows the pneumatics and electrical block diagram of the monitoring system;

FIG. 4 depicts waveforms showing the operation of the system;

FIG. 5 shows ranges of sensed vacuum/pressure for various tape operations; and

Figure 6:
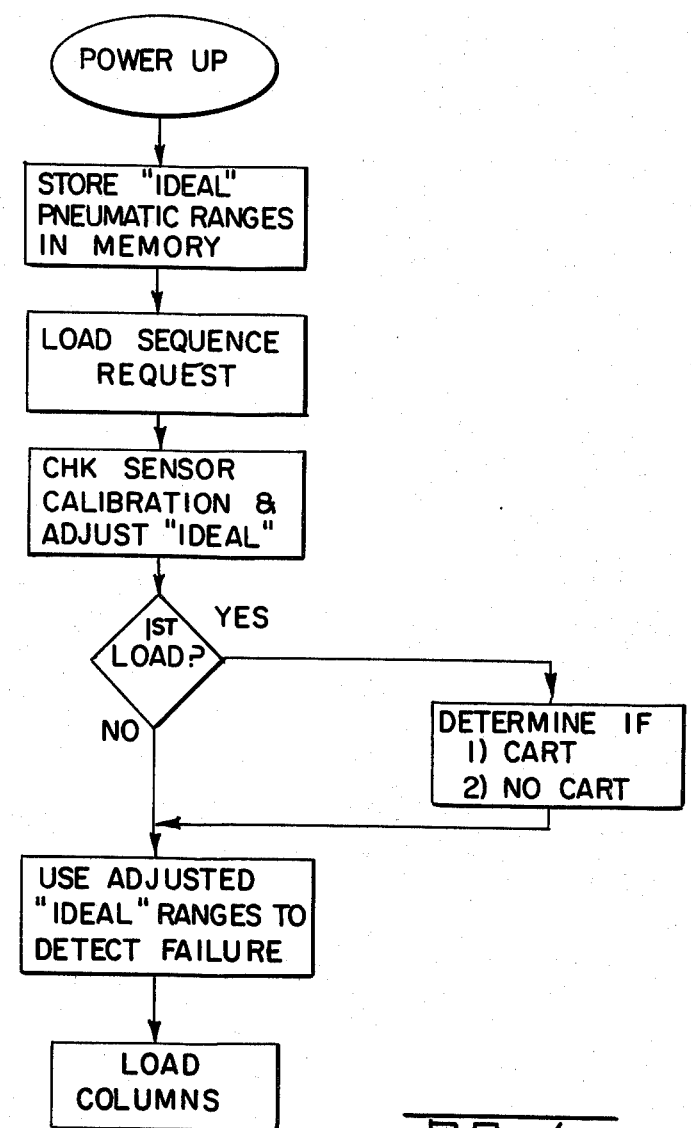

FIG. 6 is a flow chart depicting the operation of the system.

DESCRIPTION OF THE PREFERRED EMBODIMENT

Figure 1:
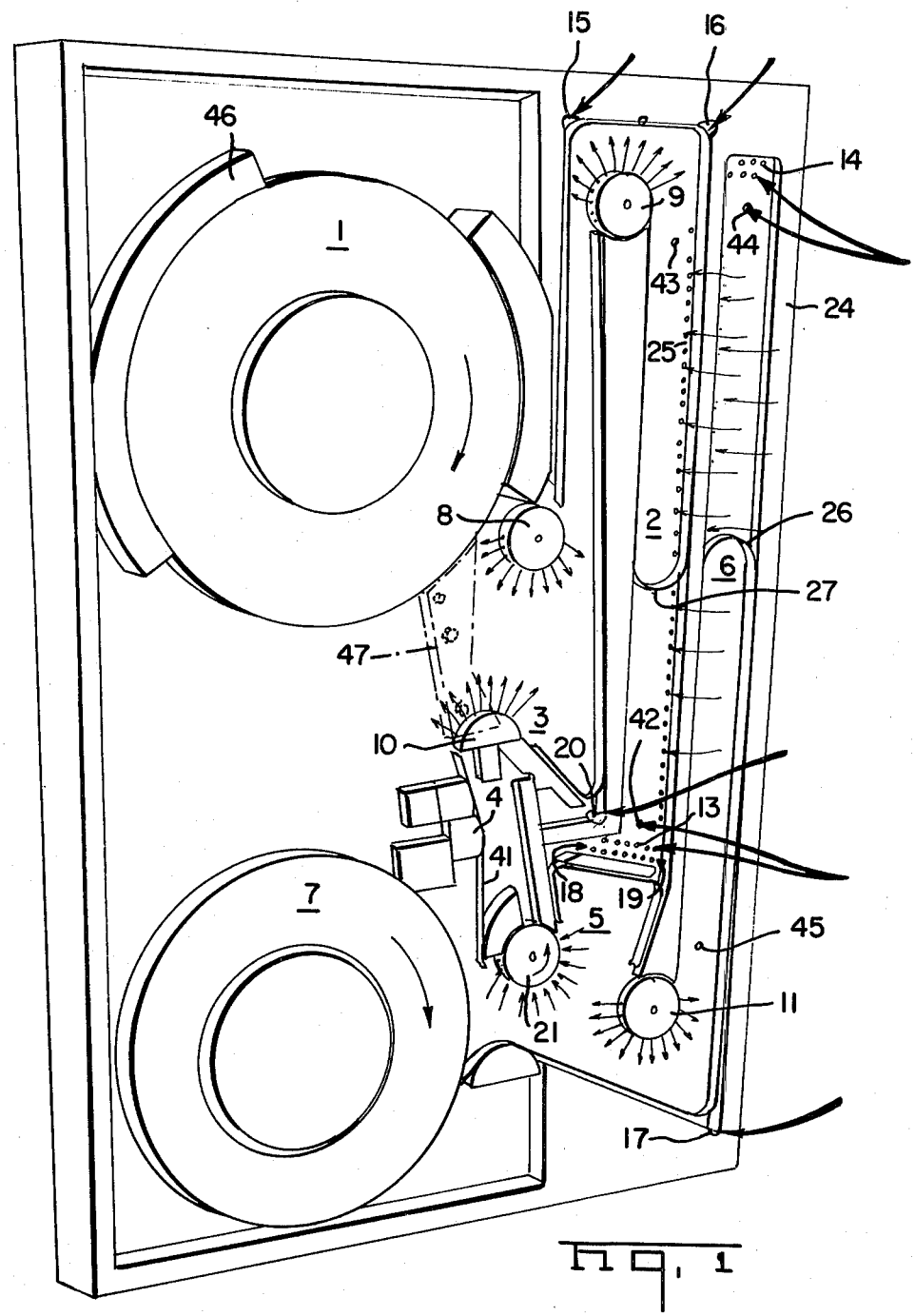
FIG. 1 shows the pneumatic system in a tape drive for which the present invention provides monitoring.

FIG. 1 shows the pneumatic system of a magnetic tape drive of the type shown in the aforementioned Epina et al patent. Tape is supplied from a "file" reel 1 mounted on a first spindle in the upper half of the machine. The tape is threaded, around a first long vacuum column 2, a first stubby column 3, past a read/write head indicated at 4, through a second stubby column 5, a second long buffer column 6, and onto a second or "machine" reel 7. The motion of the tape is kept as frictionless as possible by use of hydrostatic air bearings at 8, 9, 10 and 11 of the positive pressure type.

The tape is maintained in the several buffer columns by means of vacuum exerted through holes in the tape plate forming the tape path. For example, the first long vacuum column 2 is supplied with vacuum through a plurality of holes 13. The second vacuum column is provided with vacuum through holes 14. Vacuum is also supplied at holes 15 and 16 to define the tape path between the file reel 1 and the first long column 2, and at 17 to define the tape path after the second long column 6. The construction of the tape path is such that vacuum is also supplied, as indicated by arrows 18, and 19 to define the second isolation pocket 5, and at 20 to provide the first isolation pocket 3. The tape's actual speed past the head 4 is controlled by a vacuum assisted capstan 21.

Holes at 24 and 25 (in a preferred embodiment, 55 holes are provided at both 24 and 25) allow the vacuum sensing of the location of loops 26 and 27 of tape in the long buffer columns 6 and 2 respectively at any given time. Loop-out sensor holes 42–45 are also provided; if the loops of tape 26, 27 pass these holes, failure is indicated, and the microprocessor shuts the machine down. A cover (not shown), is used to substantially seal the long buffers 2 and 6 and the isolation pockets 3 and 5 from the atmosphere. Automatic threading is accomplished by supplying pressure to the restraint 46 during a load operation. The tape moves through threading channel 47 under control of vacuum which is applied to that channel. A vacuum inside the hub of machine reel 7 grasps the leader to complete the threading.

In the prior art machine described, the operation of the pneumatic system is monitored by the sensors shown in FIG. 1A which depicts the back side of FIG. 1. Sensors 47 and 48 are connected to the thread plenum to indicate respectively whether the machine reel is loaded and the thread vacuum is available. Sensor 50 indicates whether the tape leader is present by sensing vacuum in the thread plenum and the leader sense vacuum tap 49. Sensor 51 determines whether a cartridge is present by sensing pressure in the cartridge present tap 52. Sensor 53 indicates whether air bearing pressure is available by being coupled to the air bearing plenum tap 54. Sensor 55 indicates whether pressure is available by being coupled to the bus from the pressure pump. The sensors in FIG. 1A are mounted on the restraint plenum cover 56.

Figure 2:
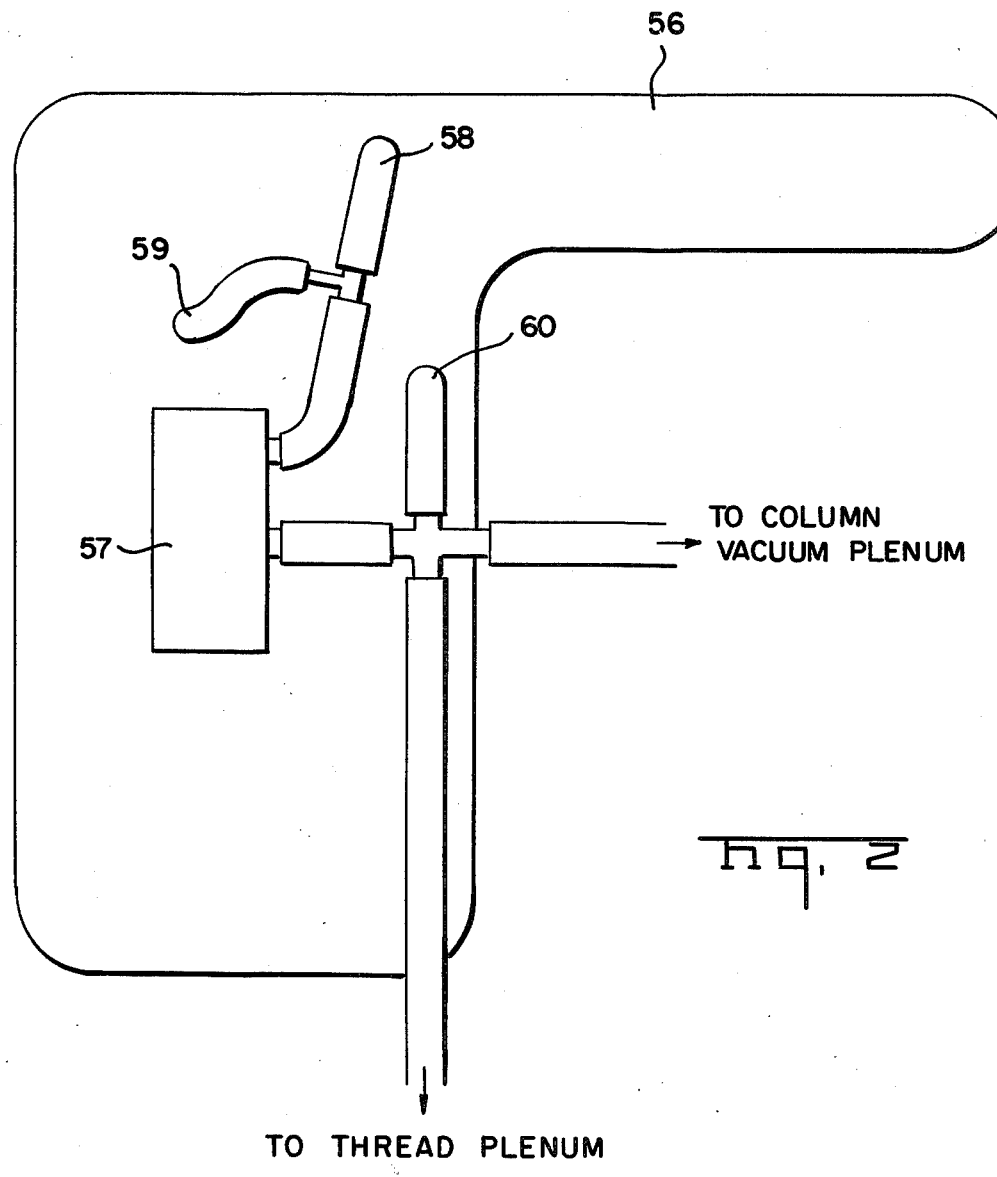
FIG. 2 is a view of the back of the tape drive showing the vacuum and pressure buses of the present invention connected to the points which are monitored.

In accordance with the present invention, these sensors are replaced by a single differential pressure transducer 57 shown in FIG. 2. Sensor 57 is connected to two pressure points and five vacuum points. One side of the sensor is connected to the thread pressure tap 58 and to the air bearing tap 59. The tap 58 is coupled to the pressure in restraint 46 and threading channel 47, respectively, (FIG. 1). The tap 59 is coupled to the pressure supplied to the air bearings 8, 9, 10 and 11 (FIG. 1).

The other side of sensor 57 is coupled to the leader sense vacuum tap 60 (FIG. 2), which is in turn coupled to the threading channel 47 (FIG. 1); to the column vacuum plenum which is coupled to the columns 6 and 2 (FIG. 1); and to the threading plenum which is coupled to the vacuum applied to the hub of the machine reel 7.

The complete pneumatics are depicted in FIG. 3 wherein the thread pressure tap 58, the air bearing pressure tap 59, the leader sense vacuum tap 60, the thread vacuum plenum and the column vacuum plenum are coupled through pneumatic diodes 61–64 to the sensor 57. The pneumatic diodes 61–64 change the sources of pressure and vacuum to the sensor from thread mode to run mode automatically.

Sensor 57 used a piezoelectric crystal 65, (in the example successfully tried) with the pressure sources connected to one side and the vacuum sources connected to the other. The normal use of piezoelectric type sensors is to monitor a varying vacuum level, or a varying pressure level, by coupling one port to the source of vacuum or pressure and coupling the other port to atmosphere. The crystal deflects away from a pressure source, causing a change in the analog voltage produced or the crystal is deflected toward a vacuum source, causing a similar change in the analog voltage. By connecting one port to the pressure source and one port to the vacuum source in accordance with the present invention, as the pressure and vacuum levels change the crystal deflects in the same direction for an increase in vacuum or an increase in pressure.

The analog voltage from crystal 65 is applied to analog to digital converter 66 which produces digital words representing the sensor voltage.

Microprocessor 67 compares the sensor output to the "expected output" at each sampling interval. The expected outputs are stored in memory 68.

The expected output ranges which are stored in memory include levels for "pressure only", "vacuum only", "pressure and vacuum", "no pressure/no vacuum" and some intermediate levels.

The expected output ranges are derived by adding an offset to the ideal ranges during a calibrate mode which occurs the first time the drive is used after being powered on.

In response to the comparison of the output of the sensor with these stored ranges, microprocessor 67 actuates an appropriate one of the indicators 69 which indicate the status of the pneumatic system of the tape drive.

The operation of the invention will be better understood with reference to FIG. 4 which is a timing chart depicting the operation of and monitoring of the pneumatic system during a calibrate mode, during the load mode when a tape is loaded onto the machine, and during a run mode when data is written to or read from a tape. These modes are controlled by the top three waveforms in FIG. 4. Those skilled in the operation of large magnetic tape drives recognize that the terms "mid-tape cartridge", "mid-tape no cartridge", "cartridge" and "no cartridge" refer to different types of tape drive operations. The expected sensor voltage range for these and other operations are shown. The voltage waveform in the middle of FIG. 5 depicts the analog sensor output voltage at various times. These various times after the power is turned on are indicated by the numerals at the bottom of the figure. What happens at each of these times is discussed below. The sequence is as follows.

(1) The power is turned on.
(2) Sensor calibration and ideal pneumatic ranges are written into memory.

(3) Sensor is read at atmospheric pressure and compared to the sensor calibration range. A failure condition exists if reading is outside of range.
(4) Load operation is initiated.
(5) Check sensor calibration at atmospheric pressure. If within the sensor calibration range calculate the offset from an ideally calibrated sensor.
(6) Add offset to ideal pneumatics ranges in memory.
(7) Pneumatics are turned on.
(8) Read the sensor. The sensor value falls within the no cartridge pneumatic range. Turn the file reel counter clockwise to position leader for threading.
(9) Read the sensor. The sensor value falls within the leader present pneumatic range. Leader is present. Continue turning file reel counter clockwise.
(10) Read the sensor. The sensor value falls within the no cartridge pneumatic range. Delay a few milliseconds to position leader, stop the file reel. Turn the file and machine reel clockwise to thread tape.
(11) Read the sensor. The sensor value falls within the midtape no cartridge pneumatic range. This indicates tape has been threaded and tape has been wrapped around the machine reel. Continue wrapping tape on the machine reel in preparation for loading columns.
(12) Read the sensor. The sensor value falls within the "midtape vacuum only" pneumatic range. Stop loading procedure. Flag vacuum only error condition.
(13) Pneumatics are turned off.
(14) An inspection of the tape drive reveals the pressure hose blew off. It is reconnected.
(15) Load operation is initiated.
(16) Same as at Time "5".
(17) Subtract the cumulative offset from the pneumatics ranges in memory. This yields pneumatics ranges in memory which are adjusted per the current sensor offset from ideal.
(18) Pneumatics are turned on.
(19) Read the sensor. The sensor reading falls within the "cartridge on" pneumatics range. Turn the file and machine reel clockwise to thread tape.
(20) Read the sensor. The sensor reading falls within the "midtape cartridge on" pneumatics range. This indicates tape has been threaded and wrapped onto the machine reel. Continue wrapping tape on the machine reel in preparation for loading columns.
(21) Transfer to run pneumatics. Load columns.
(22) Read the sensor. The sensor value falls within the "normal run" pneumatics range. Continue system type forward/backward operations.
(23) Rewind operation initiated by system. Read the sensor. The sensor value falls within the "high speed foot" pneumatics range. Continue with system operation.
(24) Stop high speed rewind operation. Read the sensor. The sensor value falls within the "normal run" pneumatics range. Continue with system forward/backward operations.
(25) Read the sensor. The sensor value falls within the "run vacuum only" pneumatics range. EPO and reset the tape unit. Flag "run vacuum only" error condition.
(26) Pneumatics are turned off.

Examples of sensor output ranges for different pneumatic conditions and for different tape operations are shown in FIG. 5 wherein the ordinate represents sensor output and various tape operations are indicated along the abscissa. For all of the tape operations, the upper range indicates that both vacuum and pressure are normal, the range indicated by dashed lines indicates that pressure only is present, and the ranges indicated by circles are those where vacuum only is present. By storing these ranges and thereafter comparing the sensor output to these ranges during the time the corresponding tape operation is being performed, the microprocessor 67 determines the condition which is present.

FIG. 6 is a flow chart which summarizes the operation. With regard to the step in which the sensor calibration is checked and adjusted to the ideal, note that the sensor reading at atmospheric pressure should always be within a prescribed a range. This prescribed range is determined by the pneumatics range being detected. In the step in which a determination is made as to whether there is a cartridge or no cartridge, note that the leader is detected by looking for a change in vacuum. If a leader is detected, it is positioned. If a leader is not detected, either a cartridge is being used, or there is a "pressure only" condition.

With respect to the step in which the ideal ranges are used to detect failure, checks are made for normal ranges first, then known failure ranges, and finally an indication of failure is given.

As examples of commercially available components which have been successfully used to practice the invention, the solid state differential pressure transducer 65 was a model 126PC sensor available from the Microswitch Division of Honeywell, Inc.; analog to digital converter 66 was an ADC 0804 available from the National Semiconductor Corporation; and microprocessor 67 was a Z80 microprocessor available from Zilog, Inc. The programming of the microprocessor is apparent to those skilled in this art from the foregoing timing chart, and from the engineering notes for the particular microprocessor being used.

While a particular embodiment of the invention has been shown and described, various modifications are within the true spirit and scope of the invention. The appended claims are, therefore, intended to cover all such modifications.

What is claimed is:

1. A pneumatic monitoring system for a magnetic tape drive in which vacuum and pressure control the movement of magnetic tape in said drive comprising:
   a pressure bus coupled to a plurality of points in said tape drive at which pressure controls the movement of said magnetic tape;
   a vacuum bus coupled to a plurality of points in said tape drive at which vacuum controls the movement of said magnetic tape;
   a sensor connected to said pressure and to said vacuum bus, said sensor producing a signal proportional to the levels of vacuum and pressure present at said points; and
   means for comparing said signal to preset ranges for calibrated conditions of said tape drive, said means indicating an error condition if said signal is outside of said ranges.

2. The system recited in claim 1 wherein said sensor is a differential pressure transducer, said pressure bus being coupled to one port, and said vacuum bus being coupled to the other port of said transducer.

3. The system recited in claim 1 further comprising:
   an analog to digital converter, the signal from said sensor being connected to said analog to digital converter; and
   a digital microprocessor, the output of said analog to digital converter being applied to said microprocessor for monitoring the condition of vacuum and pressure in said tape drive.

4. The system recited in claim 1 wherein said magnetic tape drive comprises:
a supply reel hub and a take up reel hub and a tape head mounted in the tape path between said hubs.

5. The system recited in claim 4 further comprising:
vacuum chambers for accommodating a slack loop of tape in said tape path, said vacuum bus being coupled to said columns to sense the vacuum therein.

6. The system recited in claim 5 further comprising:
air bearings having positive pressure supplied thereto and positioned in said tape path at the edges of said columns, said pressure bus being connected to a plenum supplying said air bearings to sense the pressure thereof.

7. The system recited in claim 4 wherein said tape drive includes a restraint around said supply reel hub and an automatic threading system including means for supplying pressure to said restraint;
a threading channel between said supply reel hub and said take up reel hub, vacuum being applied to said threading channel; and
means for applying vacuum to said take up reel hub during threading, said vacuum bus being connected to at least one of the points at which threading vacuum is applied.

8. The system recited in claim 7 wherein said vacuum bus is connected to said take up reel hub to sense the vacuum therein during threading and is connected to said threading column to sense the vacuum therein during threading.

9. The system recited in claim 7 wherein said pressure bus is connected to said restraint to sense the pressure therein during threading.

10. A pneumatic monitoring system for a magnetic tape drive in which vacuum and pressure control the movement of magnetic tape in said drive, said tape drive being operated in a startup mode and thereafter operated in a run mode in which the digital data is written to and read from magnetic tapes on said drive, comprising:
a pressure bus coupled to at least one point in said tape drive at which pressure controls the movement of said magnetic tape;
a vacuum bus coupled to at least one point in said tape drive at which vacuum controls the movement of said magnetic tape;
a sensor connected to said pressure and to said vacuum bus, said sensor producing a signal proportional to the levels of vacuum and pressure present at said points;
an analog to digital converter, the signal from said sensor being connected to said analog to digital converter;
a digital microprocessor, the output of said analog to digital converter being applied to said microprocessor for monitoring the condition of vacuum and pressure in said tape drive;
means in said microprocessor for storing the magnitude of said output of said sensor as a calibration signal produced during said startup mode; and
means for comparing the output of said sensor to said calibration signal modified by an offset value, during said run mode to monitor changes in said vacuum and pressure during said run mode.

11. A pneumatic monitoring system for a magnetic tape drive in which vacuum and pressure control the movement of magnetic tape in said drive comprising:
a pressure bus coupled to at least one point in said tape drive at which pressure controls the movement of said magnetic tape;
a vacuum bus coupled to at least one point in said tape drive at which vacuum controls the movement of said magnetic tape;
a sensor connected to said pressure and to said vacuum bus, said sensor producing a signal proportional to the levels of vacuum and pressure present at said points, said sensor being a differential pressure transducer, said pressure bus being coupled to one port, and said vacuum bus being coupled to the other port of said transducer, said pressure and vacuum buses being automatically switched between thread pressure and run pressure and between thread vacuum and run vacuum by the use of pneumatic diodes.

12. The system recited in claim 11 further comprising:
means for comparing said signal from said sensor to preset ranges for calibrated conditions of said tape drive, said means indicating an error condition if said signal is outside of said ranges.

* * * * *